(12) United States Patent
Brendel

(10) Patent No.: US 8,037,968 B2
(45) Date of Patent: Oct. 18, 2011

(54) AUTOMATIC LUBRICATION APPARATUS

(75) Inventor: Jürgen Brendel, Pottenstein (DE)

(73) Assignee: Baier & Koppel GmbH & Co., Pegnitz (DE)

( * ) Notice: Subject to any disclaimer, the term of this patent is extended or adjusted under 35 U.S.C. 154(b) by 1073 days.

(21) Appl. No.: 11/241,914

(22) Filed: Oct. 4, 2005

(65) Prior Publication Data

US 2007/0187181 A1 Aug. 16, 2007

(30) Foreign Application Priority Data

Oct. 4, 2004 (EP) .................................... 04023633

(51) Int. Cl.
F01M 1/00 (2006.01)
(52) U.S. Cl. .......... 184/6.14; 184/6.28; 184/26; 184/7.4
(58) Field of Classification Search ................. 184/6.14, 184/105.2
See application file for complete search history.

(56) References Cited

U.S. PATENT DOCUMENTS

| 2,731,173 | A | * | 1/1956 | Harrigan | 222/227 |
| 4,033,511 | A | * | 7/1977 | Chamberlin | 239/346 |
| 4,257,540 | A | * | 3/1981 | Wegmann et al. | 222/262 |
| 4,955,792 | A | * | 9/1990 | Skarupa | 417/399 |
| 5,060,761 | A | * | 10/1991 | Arndt et al. | 184/6.14 |
| 5,099,955 | A | * | 3/1992 | Mangen et al. | 184/7.4 |
| 5,156,531 | A | | 10/1992 | Schmid et al. | |
| 6,176,348 | B1 | * | 1/2001 | Grebe et al. | 184/27.2 |
| 6,557,651 | B1 | * | 5/2003 | Norby et al. | 175/52 |
| 6,631,787 | B2 | * | 10/2003 | Conley et al. | 184/6.14 |
| 6,672,842 | B1 | * | 1/2004 | Lounsberry et al. | 417/199.2 |
| 6,929,098 | B2 | * | 8/2005 | Ilmarinen et al. | 184/50.1 |
| 2002/0121408 | A1 | * | 9/2002 | Youngers | 184/26 |

FOREIGN PATENT DOCUMENTS

| DE | 39 30 542 | | 3/1990 |
| DE | 101 18 284 | | 5/2002 |
| DE | 10118284 | A1 * | 5/2002 |
| EP | 0340477 | A2 | 11/1989 |
| EP | 1052445 | A1 | 11/2000 |
| EP | 1 355 104 | | 10/2003 |
| FR | 2 698 130 | | 5/1994 |
| FR | 2 775 732 | | 9/1999 |
| WO | WO 02/33309 | A1 * | 4/2002 |

* cited by examiner

Primary Examiner — Bradley King
Assistant Examiner — Thomas Irvin
(74) Attorney, Agent, or Firm — Jean C. Edwards, Esq.; Edwards Neils PLLC

(57) ABSTRACT

An automatic lubrication apparatus is designed and intended to be mounted on a hydraulic tool and can be driven by a hydraulic-pressure medium, in particular on a hydraulic hammer, and includes a lubricant pump (12) incorporating a pump element. The pump element of the lubricant pump is cyclically impacted by a cam, and the cam is operatively connected to a hydromotor from which torque is transferred so as to produce synchronous rotation.

13 Claims, 6 Drawing Sheets

AUTOMATIC LUBRICATION APPARATUS

CROSS REFERENCE TO RELATED APPLICATIONS

The present application claims priority from European Patent Application Number 04023633.3 filed Oct. 4, 2004, the contents of which are hereby incorporated by reference in their entirety.

BACKGROUND OF INVENTION

The present invention relates to an automatic lubrication apparatus for hydraulic tools associated with heavy machinery, particularly heavy machinery used for construction and excavation.

The present invention relates to an automatic lubrication apparatus which is designed and intended to be mounted on a hydraulic tool that can be driven by a hydraulic-pressure medium and is in particular a detachable component of a construction machine, which is designed to be mounted on a hydraulic hammer of an excavator, such that the lubrication apparatus sends lubricant from a lubricant reservoir through a lubricant conduit to one or more sites to be lubricated, and comprises a lubricant pump including a pump element against which a cam cyclically impacts.

Automatic lubrication means for hydraulic tools associated with a construction machine are sufficiently well-known.

However, parts of such conventional lubrication means are disposed centrally in the construction machine, which is advantageous in that this position is less exposed to oscillation and is more protected, but presents the disadvantage that very long leads are needed, and more effort is required to exchange the hydraulic tool for another hydraulic tool, and to remove or attach the existing hydraulic tool.

Given this background, the document WO 02/33309 A1 has already proposed a lubrication apparatus designed and intended to be mounted on a hydraulic hammer that can be driven by a hydraulic-pressure medium and is a detachable component of an excavator, according to the structure described at the outset. This previously known apparatus, however, has the disadvantage that in this case the eccentric device that drives the pump element is driven by linear reciprocating movement of the free end of a selector piston that is part of a progressive distributor, with an intervening free-wheel mechanism. The result is a relatively jerky movement of the eccentric, because only the movement of the selector piston in the direction to drive the eccentric forward can be used, whereas in the phase of retraction of the piston the eccentric comes to a halt. Even the forward movement of the selector piston is irregular.

SUMMARY OF THE INVENTION

It is the objective of the present invention, in contrast, to create an automatic lubrication apparatus of the kind cited at the outset in which a more uniform driving of the pump element is ensured.

This objective is achieved by the characteristics of the present invention. Advantageous further developments are given in the subordinate claims.

A central idea of the present invention resides in the fact that the eccentric device (earn) driving the pump element is itself driven by a hydromotor, in a synchronized manner so that the torque is transmitted directly. Therefore, in contrast to the state of the art, the movement of the cam is not continually interrupted but rather proceeds uniformly. Because a hydromotor is distinguished by relatively high synchronization properties and direct torque transmission while driving, the cam is also driven in a synchronized manner. On the whole, therefore, a substantially more uniform transport of lubricant is ensured, which is useful in particular in view of the considerable acceleration and vibration forces that can act when a lubrication apparatus is fixed to a hydraulic tool. Because in accordance with the invention the cam is driven by a continuously operated hydromotor, a long-term operation is ensured even if the acceleration forces are of an order of magnitude equal to several times the acceleration due to gravity.

According to a first embodiment of the invention the pump element comprises a displaceably seated pump piston against which the cam strikes, and a spring to pull the pump piston back towards the cam. As a result, the pump piston is constantly kept in contact with the cam, so that the back and forth movement of the pump piston is made as uniform as possible.

In an alternative embodiment the pump element likewise comprises a displaceably seated pump piston forced into contact with the cam, but in such a way that both the forward and the backward movements of the pump piston are brought about by the cam itself.

Regarding the drive mechanism, the hydromotor can preferably make operative connection with the cam by way of a worm gearing, in which case the worm gearing can engage an off-centre gearwheel coupled coaxially to the cam so that its rotation is reliably transmitted.

According to another preferred aspect of the present invention, within the lubricant conduit, in particular inside the pump element, a nonreturn valve is provided to prevent the transported lubricant from flowing backwards.

According to a special aspect of the present invention, within the lubrication apparatus a lubricant-reservoir connection is provided, which is designed to be used both with commercially available cartridges and with a press-tube. As a result the lubrication apparatus in accordance with the invention can be employed by many users in a wide variety of countries, with no restrictions.

It is also useful for a pressure-regulating valve to be provided within the lubricant conduit, in particular inside the pump element, so that a desired maximal pressure can be specified for the lubricant conduit and/or the lubrication site.

In an embodiment that is favourable with respect to mounting and maintenance technology, the hydromotor is removably attached as a separate unit to the lubricant pump, by way of a plurality of bolts. This makes it extremely easy to exchange the hydromotor.

According to a special aspect of the present invention, the hydromotor comprises a main axis A oriented orthogonally to the axis B of the cam. In particular, the main axis A of the hydromotor can be oriented parallel to the direction of movement of the pump piston in the lubricant pump.

So that the amount of lubricant to be transported can be adjusted, a flow-control valve is provided by means of which the stream of hydraulic fluid, in particular hydraulic oil, can be set to a desired flow velocity.

A typical range of lubricant transport values for the lubrication apparatus in accordance with the invention extends from 0.5 to 1.5 $cm^3$/min, preferably from 0.8 to 1.3 $cm^3$/min. The amount transported per stroke, in a special embodiment of the invention, is between 0.15 $cm^3$/stroke and 0.20 $cm^3$/stroke, preferably about 0.18 $cm^3$/stroke.

Furthermore, a display device can also be provided on the lubrication apparatus, so that the actual level to which the lubricant reservoir is filled can be read out. Such a display device can display the current filling level continuously and/or make it possible to see that the filling level has fallen below a minimal residual level. Such a filling-level display can be implemented purely visually, by a viewing window, a scale, a display rod actuated when the piston approaches a press-tube and/or a cartridge, and/or it can be implemented by electrical transmission means through which a filling-level signal is sent to an evaluation device.

In the following the invention is explained in greater detail, also with respect to additional characteristics and advantages, with reference to the description of exemplary embodiments, assisted by the attached drawings, wherein

DESCRIPTION OF THE INVENTION

Figure 1:
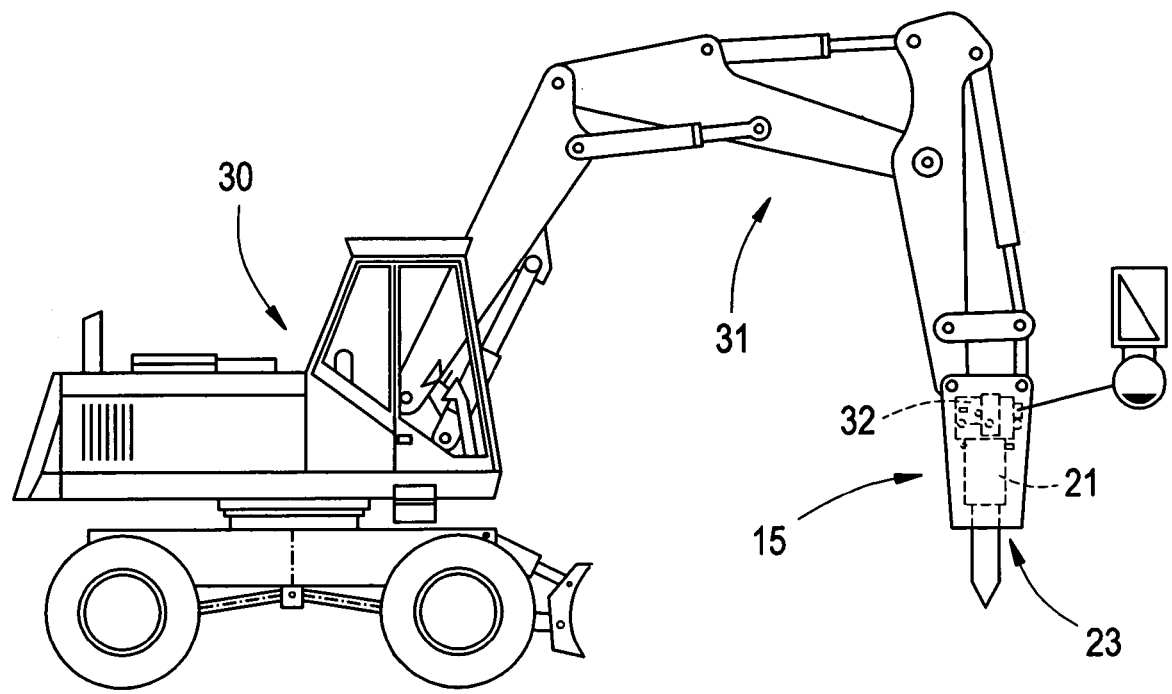
FIG. 1 shows a excavator equipped with a hydraulic hammer having its own lubrication apparatus.

In FIG. 1 a typical case of application of the lubrication apparatus in accordance with the invention is illustrated. To a construction machine 30, which here is represented specifically as an excavator, a hydraulic tool 15 is attached by way of an extension arm or boom 31. The tool 15 is equipped with a lubrication apparatus 32 according to the invention. The hydraulic hammer (chisel) is exposed to high mechanical loads and must be supplied with heat-resistant special lubricant. The following exemplary embodiments of the lubrication apparatus according to the invention, illustrated as specific structures, are also designed to be used with special lubricants having a large component of solid materials, e.g. copper chisel-paste, or to be used with EP2 fat.

The lubrication apparatus 32 in accordance with the invention is installed in the hydraulic tool 15 or its carrier device itself; which eliminates long lubricant conduits to the construction machine. Furthermore, owing to the direct installation of the lubrication apparatus 32, the chisel and lubrication apparatus can be attached as a complete unit to any excavator, because there is no need for installation in the excavator. The lubrication apparatus according to the invention is not negatively affected by the considerable vibrations and/or accelerations of the hydraulic hammer.

The lubrication apparatus according to the invention must merely be connected to the hydraulic-fluid system of the construction machine 30 by way of a high-pressure tube, in order to supply the lubrication apparatus 32 with energy. A lubricant pump 12 of the lubrication apparatus 32 is driven by a hydromotor 14, which is connected to the hydraulic circulation of the construction machine 30. For example, following actuation of the foot switch for the hydraulic tool 15, which is situated in the driver's cabin, the lubrication apparatus 32 is also supplied with hydraulic fluid to drive the hydromotor 14, so that a lubricant transport is initiated as desired.

A specific preferred embodiment is explained in the following, with reference to FIGS. 2 to 5. The embodiment of the lubrication apparatus 32 in accordance with the invention shown here is of modular construction; comprising a unit that incorporates the above-mentioned hydromotor 14 (hydromotor unit) as well as an adjacent unit that comprises the lubricant pump 12 with a cam 13 as well as a pump element 11 lubricant-pump unit).

The unit comprising the lubricant pump 12 contains, firstly, a block-shaped basic body 33, to the outer wall of which, by way of several bolts 16, is attached the hydromotor unit 14, which also comprises a cover 65 that can be removed for maintenance purposes.

In the basic body 33 are mounted the above-mentioned cam 13, which is rotatable about a main axis B, as well as the above-mentioned pump element 11, which can be moved linearly in a direction perpendicular to the main axis B of the cam 13. The cam 13, seated in two pivot bearings 34, 35, is housed in a cam recess 37, the open end of which can be closed by a cover 36. The pump element 11 is enclosed within a pump-element bore 38, which opens at one end into the cam recess 37. A lubricant-reservoir connection 24 communicates with the pump-element bore 38 by way of a connecting bore 39. The pump-element bore 38 additionally comprises a lubricant-outlet opening 40, to which a lubricant conduit 22 is connected to transport lubricant to a lubrication site 23.

Figure 2:
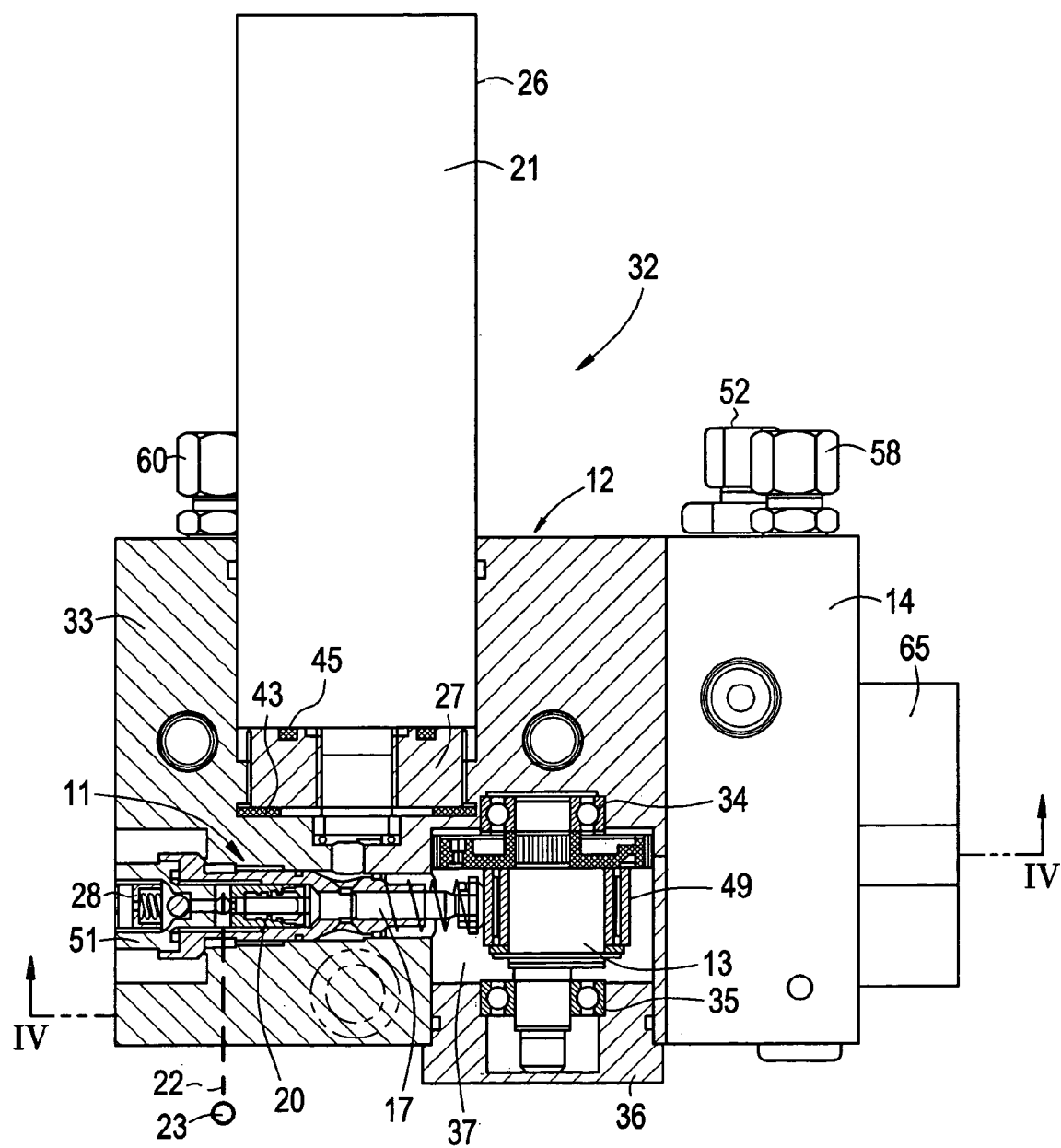
FIG. 2 shows an embodiment of a lubrication apparatus according to the invention in partial sectional view.
Figure 3:
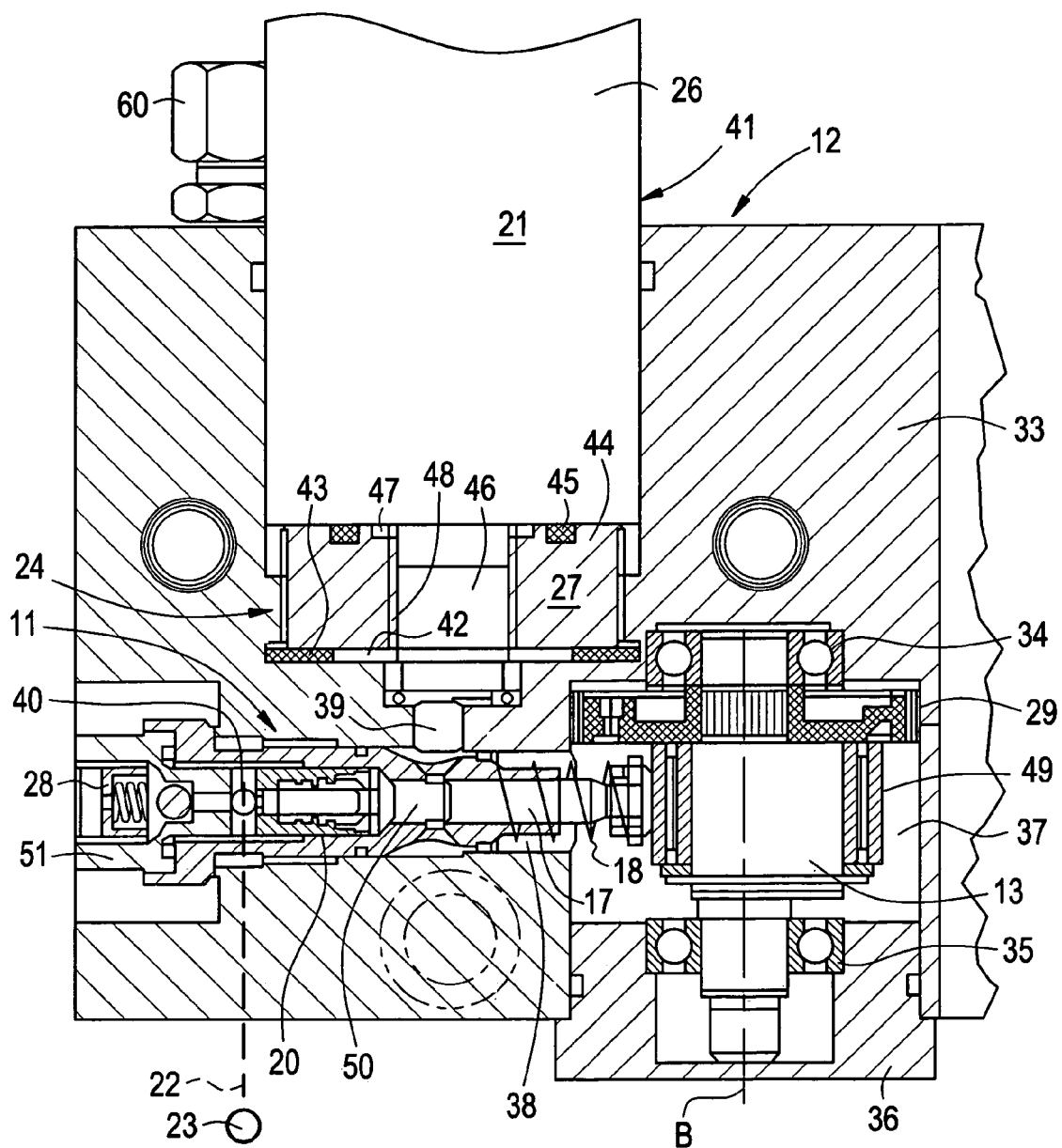
FIG. 3 is an enlargement of part of FIG. 2.
Figure 4:
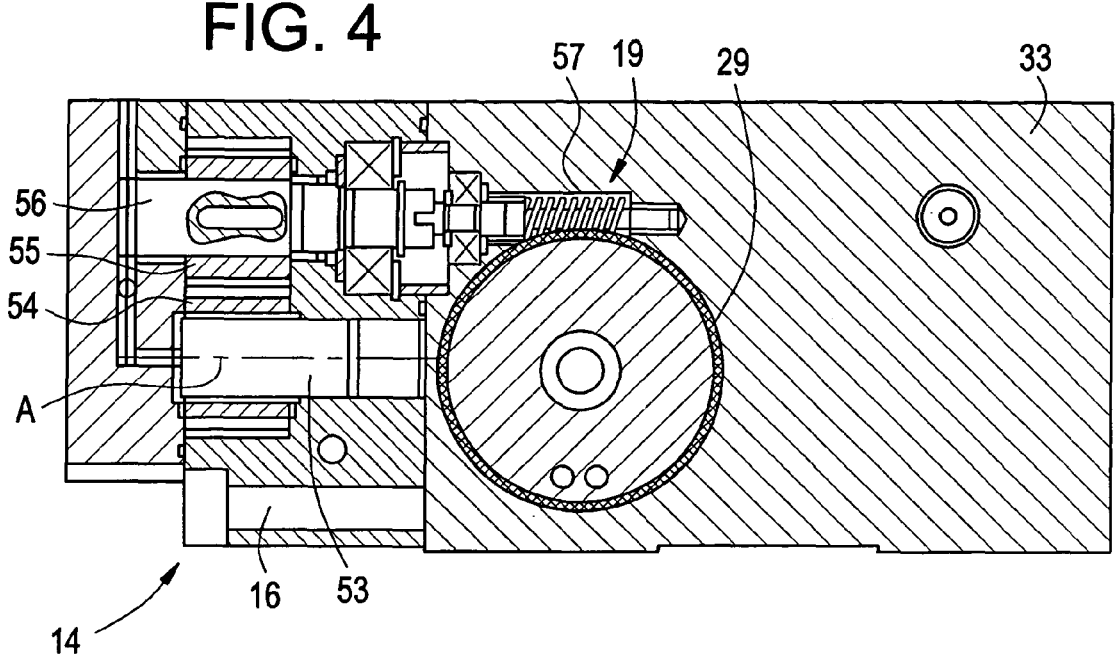
FIG. 4 is a sectional view through the lubrication apparatus illustrated in FIG. 2, along the line IV-IV in FIG. 2.
Figure 5:
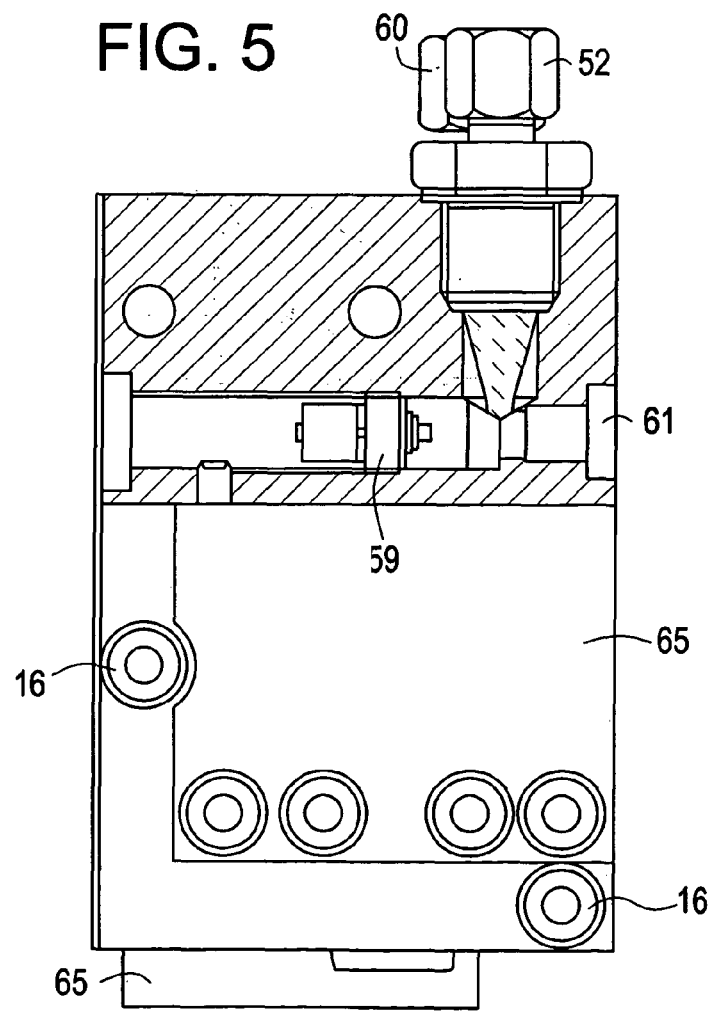
FIG. 5 is a partial cross-sectional view of the lubrication apparatus according to FIG. 2, as seen orthogonally thereto.
Figure 6:
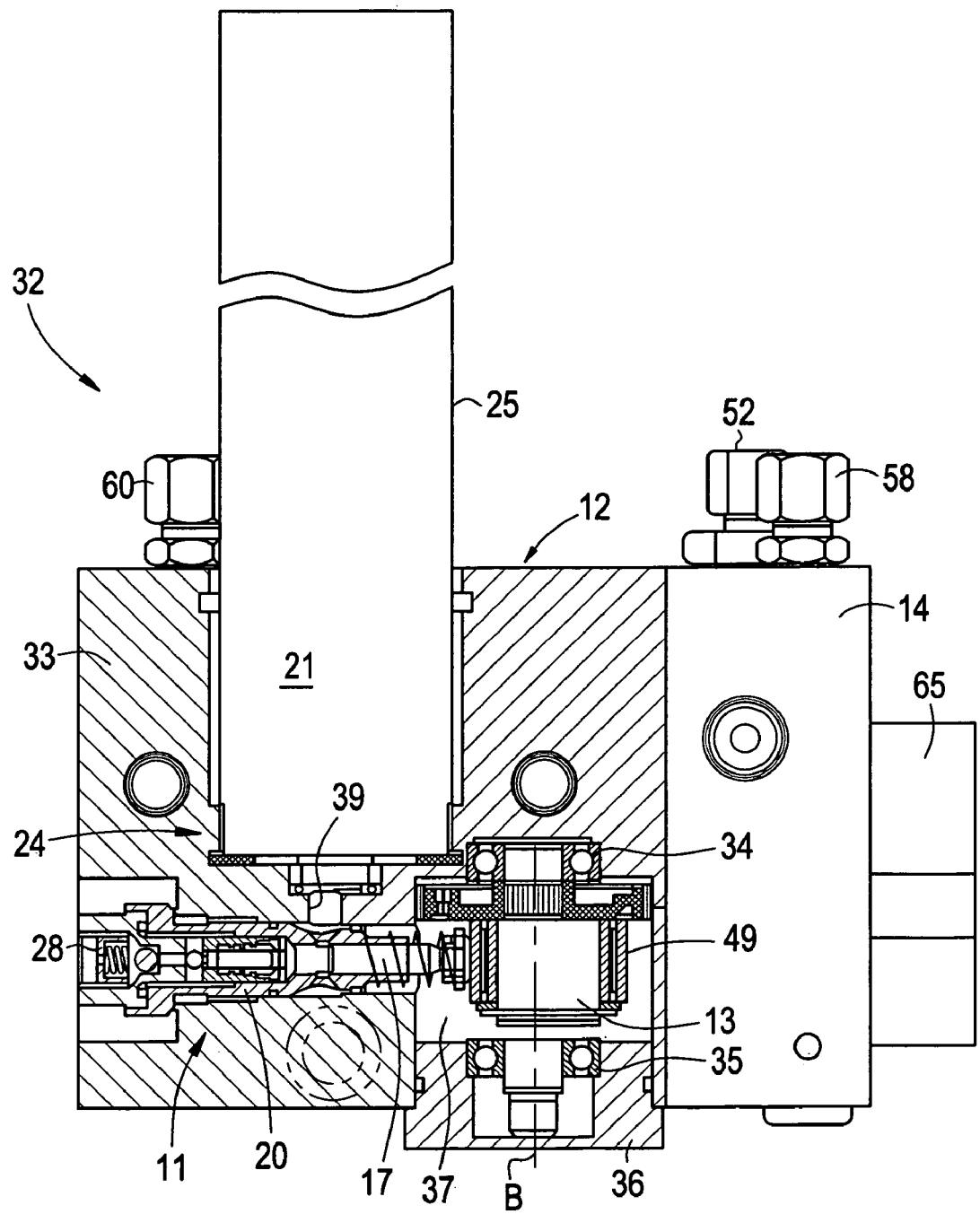
FIG. 6 shows an embodiment of the lubrication apparatus according to the invention that is modified with respect to the embodiment according to FIG. 2.

By way of the lubricant-reservoir connection 24 various kinds of lubricant reservoir 21 can be attached; the one shown in the sectional view according to FIGS. 2 and 3 is a cartridge 26, whereas in the sectional view according to FIG. 6 a press-tube 25 is attached to serve as lubricant reservoir 21.

According to a particular aspect of the present invention the lubricant-reservoir connection 24 is designed for use both with a press-tube 25, as shown in FIG. 6, and with a commercially available cartridge, as shown for example in FIGS. 2 and 3. For this purpose, in the basic body 33 there is provided a pot-shaped recess 41 having a bottom surface 42 away from which the above-mentioned connecting bore 39 extends, towards the pump-element bore 38. At the circumference of the bottom surface 42 a circular gasket 43 is provided, so that a press-tube 25 (cf. FIG. 6) or adapter 27 (cf. FIGS. 2 and 3) can be inserted onto a sealed seating. The adapter 27 itself is provided with a cartridge connector 44 and likewise comprises a circular gasket 45 to provide a seal against the cartridge 26. The adapter 27 can be screwed firmly, by way of an internal bore 46, into an internally threaded section 48 within the connecting bore 39.

Hence if the adapter 27 is previously inserted, either a press-tube 25 or a commercially available cartridge 26 can be used in the lubricant pump, whichever is preferred.

In the following, the structure and function of the pump element 11 are described in greater detail, The pump element 11 is driven by the cam 13, making contact with a cam surface 49 that encloses the cam. When the cam 13 rotates, the cam surface 49 pushes a pump piston 17 of the pump element 11 forward in a cyclic manner, during which process the pump piston 17 is kept in contact with the cam surface 49 by means of a spring 18, so that the pump piston 17 consequently carries out a uniform back-and-forth movement as the cam 13 is rotated. When the spring 18 pulls the pump piston 17 back into a retracted position, lubricant is simultaneously sucked through the connecting bore 39 into a pump volume 50 within the pump element 11. Then when the pump piston 17 is pushed forward by the cam surface 49, it presses the lubricant against a nonreturn valve 20, so that it passes out of the pump volume 50 through the lubricant outlet opening 40 into the lubricant conduit 22 and hence onto the lubrication site 23.

In order to ensure that the pressure in the lubricant conduit 22 and hence at the lubrication site 23 does not exceed a desired maximal pressure, downstream of the nonreturn valve 20 there is disposed a pressure-control valve 28 that can be adjusted to a desired maximal pressure by means of a setscrew 51.

In the following the driving mechanism for the cam 13 is discussed in greater detail. Hydraulic fluid made available at the construction machine, in particular hydraulic oil, flows through a hydraulic-fluid inlet 52 into the hydromotor 14, where it drives a first hydromotor shaft 53 that in turn, by way of a first gearwheel 54 nonrotatably fixed to the shaft, rotates a second gearwheel 55 so as to drive a second hydromotor shaft 56; subsequently the fluid emerges from the hydromotor 14 through the hydraulic-fluid outlet 58. The second hydromotor shaft 56 is axially connected to, and transmits torque to, a worm-gear arrangement 19. The worm gearing 19 projects out of the housing of the hydromotor 14 and extends into a drive bore 57 of the basic body 33, engaging a cam-side gearwheel 29 that transmits the torque to the cam 13 and hence rotates it.

Owing to the construction described above, a very uniform driving of the cam 13 is ensured.

Figure 7:
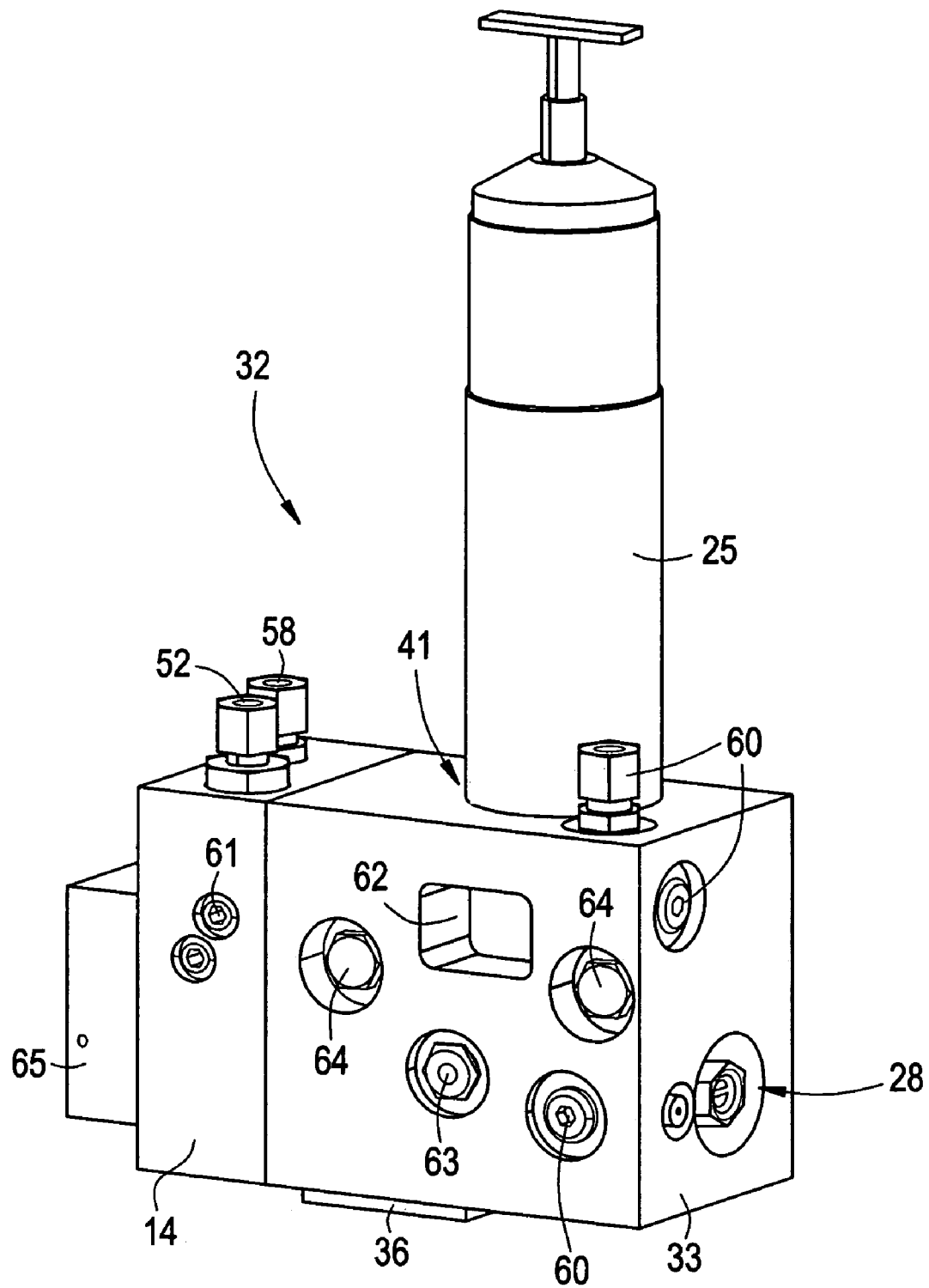
FIG. 7 is a perspective view of the embodiment of the lubrication apparatus according to FIG. 2.

In FIG. 7 a perspective view of the lubrication apparatus 32 according to FIG. 2 is shown. The flow-control valve 59 of the hydromotor 14 is covered by a sealing cap 61. The entire lubrication apparatus 32 can be attached to a hydraulic tool 15 by fixation screws 64. Because of the considerable accelerations and vibrations here, fixation of the lubrication apparatus to the hydraulic tool or a carrier device for that tool is very critical. To secure the fixation screws 64 against loosening, special security disks can be used. In addition, the threads of the two fixation screws 64 can be coated. Lubricant conduits leading to lubrication sites can be connected to a plurality of lubricant connections 60.

Within the basic body 33 a monitoring aperture 62 is provided, which opens into the pot-shaped recess 41. When transparent cartridges are used, this enables their filling level to be monitored. In the illustrated case a press-tube 25 has been inserted into the recess 41. Furthermore, a display device 63, here represented specifically by a rod, can be provided, which moves forward when the filling level of the cartridge or press-tube is low, thereby signalling this low filling level and hence notifying the operator that it will soon be necessary to exchange the cartridge or fill the press-tube.

What is claimed:

1. An automatic lubrication apparatus mounted on a hydraulic tool, and that is driven by a hydraulic-pressure medium, the lubrication apparatus being a detachable component of a construction machine, and mounted on a hydraulic hammer of an excavator, such that the lubrication apparatus transports lubricant from a lubricant reservoir through a lubricant conduit to one or more lubrication sites, the lubrication apparatus comprising: a lubricant pump that incorporates a pump element, the pump element of the lubricant pump being cyclically impacted by a radially projecting cam and being operative to supply heat-resistant hydraulic hammer lubricant comprising chisel-paste which has a component of solid materials; wherein, during operation of the lubrication apparatus, the cam is operatively connected to a hydromotor, from which torque is transferred to produce continuous, synchronous rotation of the cam in a single direction, wherein the hydromotor comprises a hydraulic-fluid inlet, a first gearwheel fixed on a first hydromotor shaft, a second gearwheel fixed to a second hydromotor shaft, the second gearwheel being in mesh with the first gearwheel, and a hydraulic-fluid outlet, wherein the cam comprises a shaft with a cam-side gearwheel which in turn is operatively connected to the second hydromotor shaft of the hydromotor by a driven shaft, such that when hydraulic fluid from the construction machine flows through the hydraulic-fluid inlet, the hydraulic fluid drives the first hydromotor shaft by way of the first gearwheel, rotates the second gearwheel so as to drive the second hydromotor shaft which in turn transmits torque to the cam through the driven shaft and the camside gearwheel, wherein the hydromotor comprises a hydromotor body and the lubricant pump comprises a pump body, and further wherein the puny body and the hydromotor body are both block-shaped bodies that are separate units and are fixed together in side-by-side fashion.

2. The lubrication apparatus according to claim 1, wherein the pump element comprises a displaceably seated pump piston against which the cam impacts, and a spring to pull the pump piston back in the direction towards the cam.

3. The lubrication apparatus according to claim 1, wherein the pump element includes a displaceably seated-pump piston such that the pump piston is forcibly guided along the cam, such that the pump piston is shifted forwards and backwards by the cam.

4. The lubrication apparatus according to claim 1, wherein the driven shaft comprises a worm gearing.

5. The lubrication apparatus according claim 1, further comprising: a nonreturn valve provided within the pump element of the lubricant conduit, to prevent the transported lubricant from flowing backwards.

6. The lubrication apparatus according to claim 1, further comprising: a lubricant-reservoir provided at the lubricant pump, for use with a press-tube.

7. The lubrication apparatus according to claim 1, further comprising: a lubricant-reservoir connection provided at the lubricant pump, for use with a standard cartridge.

8. The lubrication apparatus according to claim 1, further comprising: a lubricant-reservoir connection provided for use by means of adapters, with at least one of a standard cartridge and a press-tube.

9. The lubrication apparatus according to claim 1, wherein the pump element within the lubricant conduit includes a pressure-regulation valve.

10. The lubrication apparatus according to claim 1, wherein the hydromotor is removably attached to the lubricant pump by a plurality of bolts.

11. The lubrication apparatus according to claim 1, wherein the hydromotor comprises a main axis (A) that is oriented orthogonal to an axis (B) of the cam.

12. The lubrication apparatus according to claim 1, wherein a flow-regulation valve is provided at the hydrometer, to adjust a flow of the hydraulic fluid that drives the hydromotor, and the amount of lubricant that is being transported.

13. The lubrication apparatus according to claim 1, further comprising: a display device provided to display a level to which the lubricant reservoir is currently filled.

* * * * *